United States Patent [19]

Hammond

[11] Patent Number: 4,506,934
[45] Date of Patent: Mar. 26, 1985

[54] CHORDAL ACTION ISOLATION WHEEL ASSEMBLY

[75] Inventor: Stephen A. Hammond, San Jose, Calif.

[73] Assignee: FMC Corporation, Chicago, Ill.

[21] Appl. No.: 456,220

[22] Filed: Jan. 7, 1983

[51] Int. Cl.³ .............................................. B62D 55/12
[52] U.S. Cl. ....................................... 305/57; 305/22; 74/443
[58] Field of Search .................... 74/443, 445; 305/22, 305/56, 57

[56] References Cited

U.S. PATENT DOCUMENTS

| | | | |
|---|---|---|---|
| Re. 30,039 | 6/1979 | Clemens et al. | 305/21 |
| 2,199,292 | 4/1940 | Pierce | |
| 3,198,273 | 8/1965 | Turpen, Jr. | 305/56 X |
| 3,523,463 | 8/1970 | Van Thielen | |
| 3,567,292 | 3/1971 | Amsden | |
| 3,730,013 | 5/1973 | Slemmons | 305/57 X |
| 3,819,239 | 6/1974 | Arcouette | |
| 3,993,356 | 11/1976 | Groff et al. | |
| 4,069,856 | 1/1978 | Sogge | |
| 4,082,372 | 4/1978 | Kozuki | 305/57 |
| 4,175,796 | 11/1979 | Boggs et al. | 305/57 X |
| 4,278,303 | 7/1981 | Livesay | |

FOREIGN PATENT DOCUMENTS 611801 6/1978 U.S.S.R. ............................. 305/56

Primary Examiner—David A. Scherbel
Attorney, Agent, or Firm—Lloyd B. Guernsey; H. M. Stanley; R. B. Megley

[57] ABSTRACT

A chordal action isolation wheel assembly for reduction of noise in track-laying vehicles by using a pendulous isolation wheel to isolate chordal track forces from a smaller drive sprocket. The drive sprocket is mounted on a drive shaft and one end of a pendulous arm is rotatably connected to the drive shaft. The isolation wheel is rotatably mounted on the other end of the pendulous arm and an endless track is trained about both the isolation wheel and the drive sprocket with only a small portion of the periphery of the drive sprocket contacting the endless track. The larger diameter of the isolation wheel causes a gentle lowering of the endless track onto the drive sprocket to reduce the force transmitted to the sprocket wheel and reduced noise. Chordal impacts of the track shoes occur against the isolation wheel, and the resulting vibrational energy is absorbed by the pendulous action of the isolation wheel assembly.

5 Claims, 6 Drawing Figures

U.S. Patent  Mar. 26, 1985  Sheet 1 of 2  4,506,934
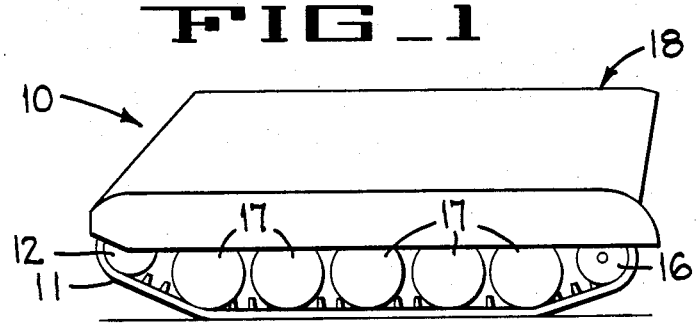
FIG_1
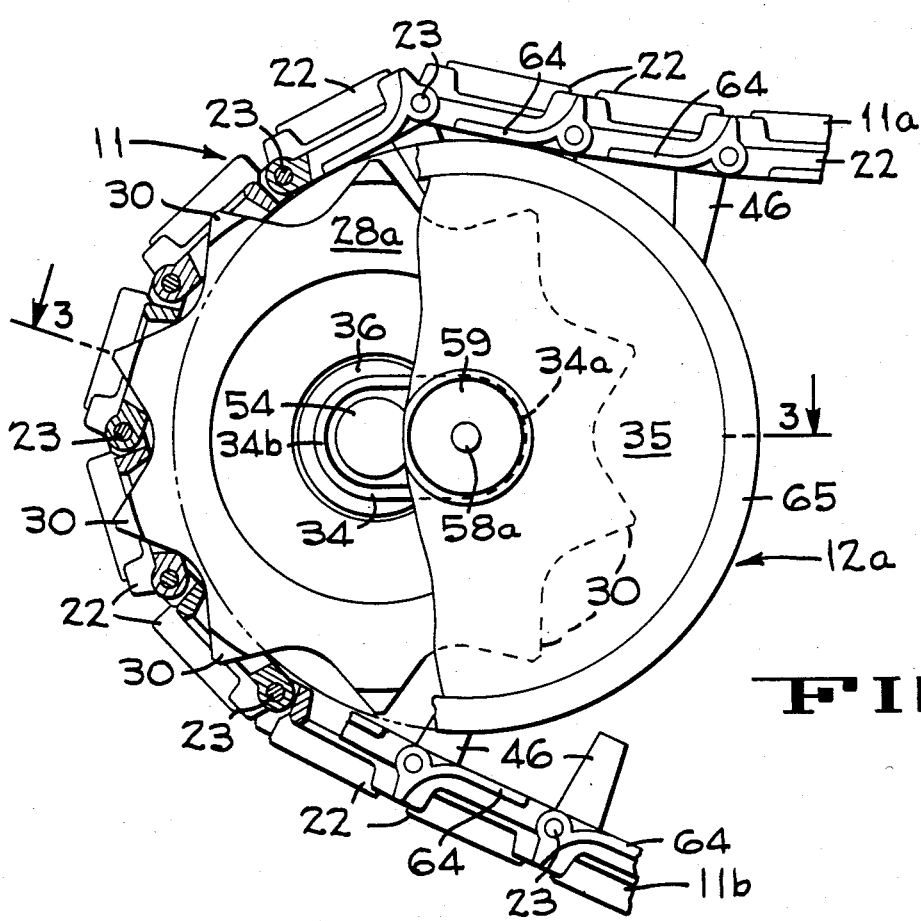
FIG_2
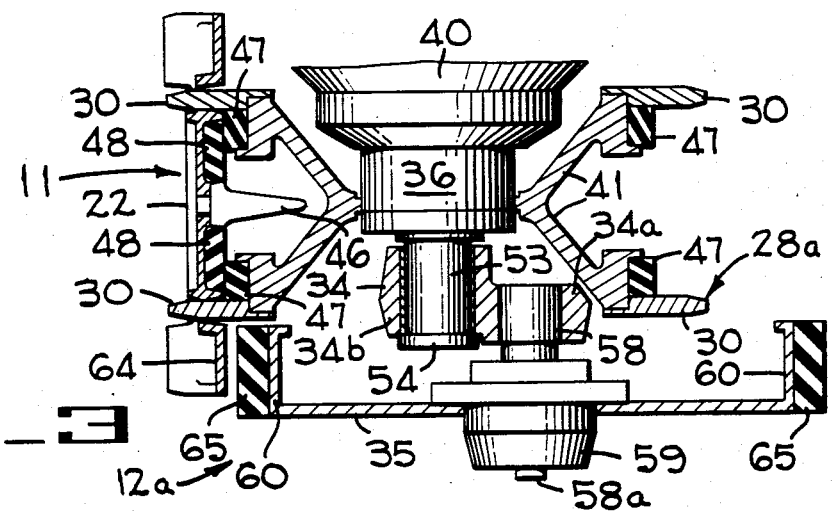
FIG_3

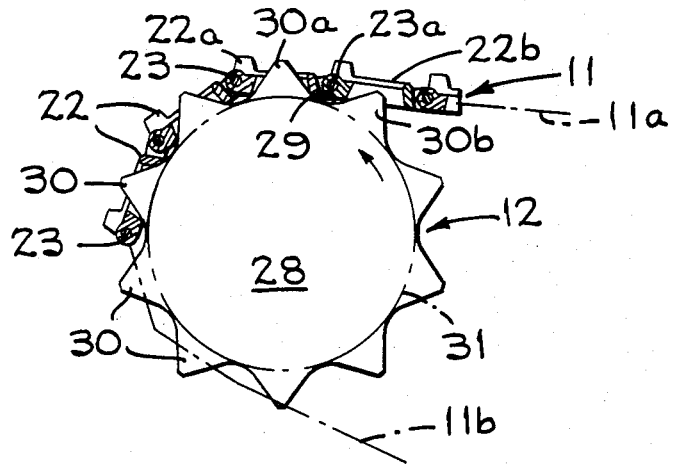
FIG_4 PRIOR ART
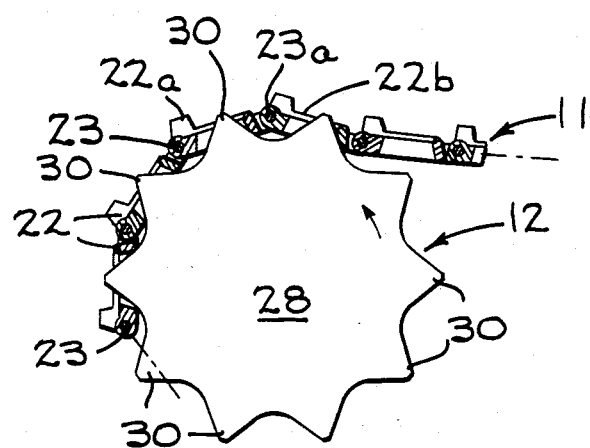
FIG_5 PRIOR ART
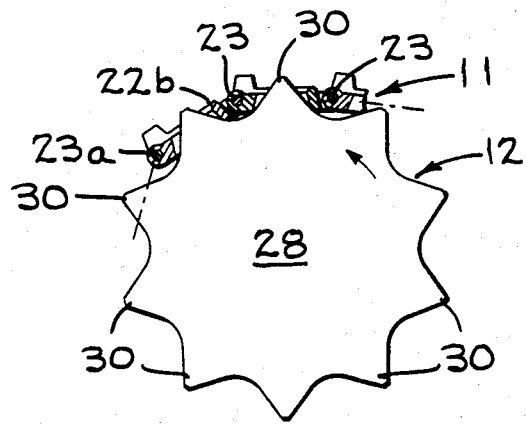
FIG_6 PRIOR ART

CHORDAL ACTION ISOLATION WHEEL ASSEMBLY

BACKGROUND OF THE INVENTION

The present invention pertains to track-laying crawler vehicles, and more particularly, to means for reducing the noise generated by the drive sprocket assembly in such crawler vehicles.

It has been established that the major source of noise-producing vibration in track vehicles is in the track system. The vibration causes hull panel or frame resonances and internal noise levels which are extremely uncomfortable to personnel, and which can in some instances be dangerous. Tests have shown that a large portion of the noise generated in the track system can be attributed to an interaction of the track segments with the drive sprocket and with the bogey and idler wheels. The track segments are relatively wide, that is, long in the direction of their movement. Thus, the track segments cannot smoothly follow a change in the direction such as occurs when they are carried around the drive sprocket, under the bogey wheels and around the idler wheels. As a result, the track segments slap against the drive sprocket, bogey wheels and idler wheels, and produce torsional vibrations and displacement of the wheels, which in turn generate both noise, structure-borne vibration and wear problems. Engagement and disengagement of the sprocket teeth with the segments also produce force and torque variations on the sprocket hub.

A large amount of noise in the drive sprocket is due to chordal action which, in a conventional drive sprocket configuration, is generated by the track entering the sprocket at approximately the one o'clock position from the upper strand, wrapping counterclockwise around the sprocket, and exiting from the sprocket at the six-thirty o'clock position. As the track is carried around the sprocket, it cannot form a smooth arc (as could a belt) because of the rigid track shoes. Instead, the shoes form a part of a polygon, which is equivalent to a series of chords of a circle, hence the name chordal action. Chordal action causes the velocity and acceleration of entering and exiting track pins to vary in a cyclical manner. As a track pin arrives directly above the sprocket, its horizontal velocity is at a maximum and its vertical or radial velocity is zero. As the track pin moves around the drive sprocket the horizontal velocity is reduced, while the vertical downward velocity is increased. Because of the rapidity of the velocity changes and the massiveness of the track, considerable vertical impact forces are generated causing vibrations and noise.

SUMMARY OF THE INVENTION

The present invention reduces the noise generated by connecting the sprocket wheel directly to the drive axle in the usual manner and using an offset-mounted isolation wheel to reduce the portion of the sprocket wheel which contacts the endless track. The isolation wheel has a diameter which is substantially larger than the diameter of the sprocket wheel. A pendulous arm has one end thereof rotatably mounted about the drive axle and the isolation wheel is mounted at the other end of the pendulous arm. The endless track is threaded about a portion of the isolation wheel with a considerably smaller portion of the track threaded about the sprocket wheel. The larger diameter of the isolation wheel causes a gentle lowering of the track segments from the isolation wheel onto the sprocket wheel to reduce the forces transmitted to the sprocket wheel and thus reduce noise. The smaller portion of track contracting the sprocket wheel allows only one or two sprocket teeth to engage the track for driving purposes, thus further reducing the transfer of vibrational or impactive energy from the track to the sprocket wheel.

BRIEF DESCRIPTION OF THE DRAWINGS

FIG. 1 is a schematic side elevation of a tracked vehicle.

FIG. 2 is an enlarged side elevation view of an isolation wheel assembly, with portions broken away, according to the preferred embodiment of the invention.

FIG. 3 is a cross-sectional view of the isolation wheel assembly according to the present invention taken along line 3—3 of FIG. 2.

FIGS. 4–6 diagrammatically illustrate chordal action and vibratory action of the endless track.

DESCRIPTION OF THE PREFERRED EMBODIMENT

One type of amphibious, tracked vehicle 10 (FIG. 1) is provided at each side with an endless track 11 that is trained around a drive sprocket wheel assembly 12, an idler sprocket wheel assembly 16 and which has its lower side engaged by bogey wheels 17 to support a hull 18. The bogey wheels are each mounted on individual suspension arms (not shown) and a drive and an idler sprocket wheel are each mounted on axles about which the spocket wheels can rotate. In the usual manner, the tracks comprise a series of segments or track shoes 22 which are shown enlarged in FIG. 2, and are adapted to follow the ground contour, being pivotally interconnected by pivot pins 23.

In prior-art wheel assemblies which include only a simple drive sprocket, a considerable amount of noise and wear is caused by the relatively large pitch of the track segments and the relatively small diameter of the drive sprockets, due of course to design limitations which dictate the size of these elments. The result is that the track shoes slap with a substantial impact against the sprockets and produce translational and torsional vibrations in the plane of the sprocket wheel assemblies. The track shoes have a similar action against the idler and bogey wheels. The torsional and lateral vibrations are transmitted to the panels of the hull 18 and thus resonate the panels and cause high levels of noise, so much noise, in fact, that it can exceed a safe level for the personnel in the vehicle.

A substantial portion of the noise generated in the conventional drive sprocket wheels is the result of chordal action. Chordal action is the variation from smooth or even power transmission during sprocket/track engagement. The power is transmitted with a variation in driving speed for each track segment, and the sprocket engagement can be described as a series of impacts. Also, a vibrating motion is caused by the rise and fall of the track as it goes over a small sprocket.

In the conventional sprocket configuration (FIG. 4) the track enters the sprocket at approximately the one o'clock position from the upper strand, wraps around the sprocket and exits at approximately the six-thirty position. As the track is carried around the sprocket it cannot form a smooth arc (as could a belt) because of the rigid track shoes. Instead the shoes form part of a polygon, which is equivalent to a series of chords of a circle, from hence comes the name chordal action. Chordal action causes the velocity and acceleration of entering and exiting track pins to vary in a cyclical manner. As a track pin arrives directly above the socket, its horizontal velocity is at a maximum and its vertical or radial velocity is zero. Slightly later the horizontal velocity is reduced while the vertical downward velocity is increased. Because of the rapidity of the velocity changes and the massiveness of the track, considerable vertical impact forces are generated.

Details of the chordal action can be seen in FIGS. 4–6 which illustrate a sequence of actions of the drive sprocket wheel and the endless track in conventional equipment which does not include the wheel assembly apparatus disclosed in the present invention. As a drive sprocket wheel 28 (FIGS. 4–6) rotates counterclockwise into the position shown in FIG. 4, a pivot pin 23a contacts a valley 29 between a pair of sprocket teeth 30a, 30b with the valley 29 moving in an upward and leftward direction. The upward movement of the valley 29 causes the valley to impact the pin 23a and into the adjacent ends of the track shoes 22a, 22b suddenly lifting the track 11 in general, and the shoes 22a, 22b in particular, from the level shown in FIG. 4 toward the level shown in FIG. 5. As the pin 23a reaches the top of a pitch circle 31, the pin 23a and the adjacent ends of the shoes 22a, 22b start movement in a downward direction toward the position shown in FIG. 6. The impact of the sprocket wheel with the track, and the sudden acceleration and deceleration of the track as it rises and falls detracts from track performance and track life, generates noise and vibration and curtails the power transmitted to the endless track 11.

The present invention discloses a chordal action isolation wheel assembly 12a (FIGS. 2, 3) comprising a sprocket wheel 28a, a pendulous arm 34 and a chordal action isolation wheel 35 to improve track life and performance, and to reduce noise and vibration by keeping the chordal impact forces from reaching the sprocket wheel 28a. The sprocket wheel 28a (FIGS. 2, 3) is secured to a drive shaft 36 which extends outwardly from a drive housing 40. The sprocket wheel 28a includes a peripheral groove 41 for the usual guide lugs 46 (FIGS. 2, 3) of the track shoes 22. A pair of external elastomeric rings 47 (FIG. 3) adjacent the sprocket teeth 30 provide for cushioned contact with the track shoes 22 in the known manner. Each of the track shoes 22 also includes a pair of elastomeric inserts 48 to provide additional cushioned contact with the elastomeric rings 47 of the sprocket wheel 28.

The chordal action isolation wheel 35 (FIGS. 2, 3) is connected to the drive shaft 36 by a pendulous arm 34 having a first end portion thereof rotatably mounted on a sprocket spindle 53 extending outwardly from the drive shaft 36. A flange 54 at the outer end of the sprocket spindle 53 secures the pendulous arm 34 to the spindle 53. An isolation wheel spindle 58 is secured in the other end portion of the pendulous arm 34 and an idler assembly 59 is rotatably mounted on an outer end 58a of the spindle 58. The isolation wheel 35 is welded or otherwise secured to the idler assembly 39. A rim portion 60 of the isolation wheel 35 provides support for an outer portion 64 of the track shoes 22. An elastomeric ring 65 bonded to the rim portion 60 provides for cushioned contact between the track shoes 22 and the isolation wheel 35.

Applicant's chordal action isolation wheel 35 (FIG. 2) is of a larger diameter than the sprocket wheel 28a and is free to rotate about an outer end 34a of the pendulous arm 34. The other end 34b of the pendulous arm is mounted at the center of rotation of the sprocket wheel 28a so the sprocket wheel can rotate while the pendulous arm 34 remains relatively stationary. The arm 34 is free to swing up and down over a distance which is limited by the upper portion 11a and the lower portion 11b of the track, and by the diameter of the isolation wheel 35 positioned between these portions of the track.

The upper portion 11a of the track approaches the isolation wheel 35 (FIG. 2) approximately tangential to the periphery of the wheel to provide a smoother movement of the track onto the wheel 35. Track shoe impacts are against the isolation wheel 35, and the resulting vibrational energy is absorbed by the swinging of the isolation wheel assembly 12 on its pendulum arm 34. The isolation wheel 35 gently lowers the track 11 onto the sprocket wheel 28a to minimize the forces transmitted to the sprocket wheel. The large diameter isolation wheel 35 allows only one or two sprocket teeth 30 to engage the track 11 for driving purposes, thus, further minimizing the transfer of vibrational or impactive energy from the track 11 to the sprocket wheel 28a.

Although the best mode contemplated for carrying out the present invention has been herein shown and described, it will be apparent that modification and variation may be made without departing from what is regarded to be the subject matter of the invention.

What is claimed is:

1. A chordal action isolation wheel assembly for an endless-track laying vehicle, said wheel assembly comprising:
   a rotatable drive axle for connection to a power source;
   a sprocket wheel having a sprocket hub fixed to said drive axle for rotation with said axle, said sprocket wheel having a plurality of axially spaced sprocket teeth equidistantly spaced about the outer periphery of said sprocket hub for movably engaging an endless track;
   a pendulous arm having a first end portion rotatably mounted about said drive axle;
   an isolation wheel; and
   means for rotatably mounting said wheel to a second end portion of said pendulous arm with said endless track threaded about said isolation wheel said isolation wheel having an upper portion in a plane higher than the upper portion of said sprocket wheel, said isolation wheel supporting said endless track and gently lowering said track onto said sprocket wheel as said sprocket wheel rotates.

2. A chordal action isolation wheel assembly as defined in claim 1 wherein said isolation wheel has a diameter substantially larger than the diameter of said sprocket wheel.

3. A chordal action isolation wheel assembly as defined in claim 2 wherein the length of said pendulous arm positions said isolation wheel at a distance from said sprocket wheel which causes said sprocket teeth to engage said endless track over a distance substantially less than half of the periphery of said sprocket wheel.

4. A chordal action isolation wheel assembly as defined in claim 2 wherein said endless track is threaded about a portion of said isolation wheel and is threaded about a substantially smaller portion of said sprocket wheel.

5. A chordal action isolation wheel assembly as defined in claim 2 wherein said endless track retains said isolation wheel in a position between portions of said track.

* * * * *